(12) United States Patent
Riddering et al.

(10) Patent No.: US 7,068,449 B2
(45) Date of Patent: Jun. 27, 2006

(54) SLIDER FLY CONTROL

(75) Inventors: Jason W. Riddering, Prior Lake, MN (US); Wayne A. Bonin, North Oaks, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 363 days.

(21) Appl. No.: 10/135,734

(22) Filed: Apr. 30, 2002

(65) Prior Publication Data
US 2003/0011915 A1    Jan. 16, 2003

Related U.S. Application Data

(60) Provisional application No. 60/305,794, filed on Jul. 16, 2001.

(51) Int. Cl.
*G11B 5/02* (2006.01)
*G11B 21/02* (2006.01)

(52) U.S. Cl. .......................... 360/25; 360/75
(58) Field of Classification Search ................ 360/75, 360/25
See application file for complete search history.

(56) References Cited

U.S. PATENT DOCUMENTS

| | | | |
|---|---|---|---|
| 4,481,616 A | 11/1984 | Matey | 369/58 |
| 4,777,544 A * | 10/1988 | Brown et al. | 360/75 |
| 5,168,483 A | 12/1992 | Oka et al. | 369/13 |
| 5,377,058 A * | 12/1994 | Good et al. | 360/75 |
| 5,382,911 A | 1/1995 | Cotler et al. | 324/662 |
| 5,774,293 A | 6/1998 | Stupp | 360/75 |
| 5,810,477 A | 9/1998 | Abraham et al. | 374/7 |
| 5,818,592 A * | 10/1998 | Womack et al. | 365/511 |
| 5,831,781 A * | 11/1998 | Okamura | 360/31 |
| 6,019,503 A | 2/2000 | Abraham et al. | 374/4 |
| 6,046,596 A * | 4/2000 | Schaenzer et al. | 324/662 |
| 6,088,200 A | 7/2000 | Morita | 360/135 |
| 6,125,008 A * | 9/2000 | Berg et al. | 360/264.4 |
| 6,215,627 B1 | 4/2001 | Resh et al. | 360/245.6 |
| 6,262,572 B1 | 7/2001 | Franco et al. | 324/212 |
| 6,269,687 B1 | 8/2001 | Zhang et al. | 73/105 |
| 6,304,407 B1 | 10/2001 | Baker et al. | 360/75 |
| 6,359,746 B1 * | 3/2002 | Kakekado et al. | 360/75 |
| 6,411,458 B1 * | 6/2002 | Billings et al. | 360/75 |
| 6,501,606 B1 * | 12/2002 | Boutaghou et al. | 360/25 |

OTHER PUBLICATIONS

Daughton, Jim, Magnetoresistive Random Access Memory (MRAM), Feb. 4, 2000, NVE Corporation White Paper, pp. 113.*

Daughton, Jim, Magnetoresistive Random Access Memory (MRAM), Feb. 4, 2000, NVE Corporation White Paper, pp. 1-13.*

* cited by examiner

*Primary Examiner*—Wayne Young
*Assistant Examiner*—Daniel L. Negrón
(74) *Attorney, Agent, or Firm*—Westman, Champlin & Kelly

(57) ABSTRACT

A disc drive data storage system is disclosed that includes a disc storage medium having a disc surface. The system also includes an armature and a slider coupled to the armature. The slider supports a transducer head that communicates with the disc storage medium. The slider flies above the disc surface and positions the transducer head proximate the disc surface. Data representing a topography map of the disc surface is stored in a memory. A controller controls the fly height of the slider above the disc surface as a function of the topography map of the disc surface.

19 Claims, 5 Drawing Sheets

SLIDER FLY CONTROL

CROSS-REFERENCE TO RELATED APPLICATION

This application claims priority to U.S. Provisional Application No. 60/305,794, filed Jul. 16, 2001 and entitled "CAPACITANCE MAPPING AND STORAGE OF DISC TOPOGRAPHY FOR ACTIVE FLY CONTROL," which is herein incorporated by reference.

FIELD OF THE INVENTION

The present invention relates to data storage systems. More specifically, the present invention relates to a system for active fly height control of a slider used in a disc storage system.

BACKGROUND OF THE INVENTION

Disc storage systems are known in the art and are used to store information for later retrieval. Such disc storage systems include a rotating disc which carries information thereon. A transducing head is positioned over a surface of the disc while the disc rotates at high speed. The head is carried on a slider which is designed to "fly" just over the surface of the rotating disc, the separation between the slider and the disc being maintained by a film of air (air bearing). The head is used to write information onto the disc or read information from the disc when the slider flies over the disc surface. Such information may be, for example, magnetically or optically encoded on the disc surface.

Increased storage density is becoming increasingly important. One technique known to increase storage density is to decrease the "fly height" of the head. Fly height is defined as the distance between the disc surface and the head or slider during operation of the storage system. A reduced fly height allows information to be written or read back more precisely and such information can be stored in a smaller area (i.e., at a higher density).

During its flight, the slider undergoes continuous vibration, pitch and roll as the topography of the disc changes beneath the slider. If the quality of the disc or the slider is poor, occasional rubbing or sharp contact may occur between the disc and the slider, leading to damage to the head or to the disc, and possibly the loss of valuable data. Various attempts have been made to provide increased assurance that such undesirable contact between the slider and the disc does not occur. These techniques include rigid manufacturing and quality assurance specifications for both the disc and the air bearing surface of the slider. However, in disc drives employing sliders operating at extremely low fly heights, the air bearing itself cannot maintain proper clearance with the disc. This is because of several factors including mean losses from disc glide avalanche, carbon overcoats, pole tip recession and lubricant coating on the disc surface that leave insufficient space for the air-bearing surface to provide the necessary fly height variation. U.S. Pat. No. 5,377,058 entitled "FLY HEIGHT SERVO CONTROL OF READ/WRITE HEAD SUSPENSION" describes a technique for fly height control of a slider flying at a very low fly height. The technique described in U.S. Pat. No. 5,377,058 relates to correcting the fly height for both radial and circumferential error as the head changes radial and circumferential position relative to the disc surface. In general, this technique includes sensing the fly height in real time, comparing the sensed fly height against a reference fly height, and adjusting the suspension system of the slider in accordance with the departure of the sensed fly height of the slider from the reference fly height. However, sensing the fly height in real time during disc read/write operations may interfere with the read/write process because the fly height sensor and the read/write head are usually in close proximity with each other. In addition, dynamically sensing fly height during the reading and writing of data adds complexity to the read/write process.

The present invention addresses these problems, and offers other advantages over the prior art.

SUMMARY OF THE INVENTION

A disc drive data storage system is disclosed that includes a disc storage medium having a disc surface. The system also includes an armature and a slider coupled to the armature. The slider supports a transducer head that communicates with the disc storage medium. The slider flies above the disc surface and positions the transducer head proximate the disc surface. Data representing a topography map of the disc surface is stored in a memory. A controller controls the fly height of the slider above the disc surface as a function of the topography map of the disc surface.

These and various other features as well as advantages which characterize the present invention will be apparent upon reading of the following detailed description and review of the associated drawings.

BRIEF DESCRIPTION OF THE DRAWINGS

FIG. 4-1 is a simplified block diagram of a portion of the disc drive illustrating fly height adjustment in accordance an embodiment of the present invention.

FIG. 4-2 is a simplified block diagram of a portion of the disc drive illustrating fly height adjustment in accordance another embodiment of the present invention.

DETAILED DESCRIPTION

Figure 1:
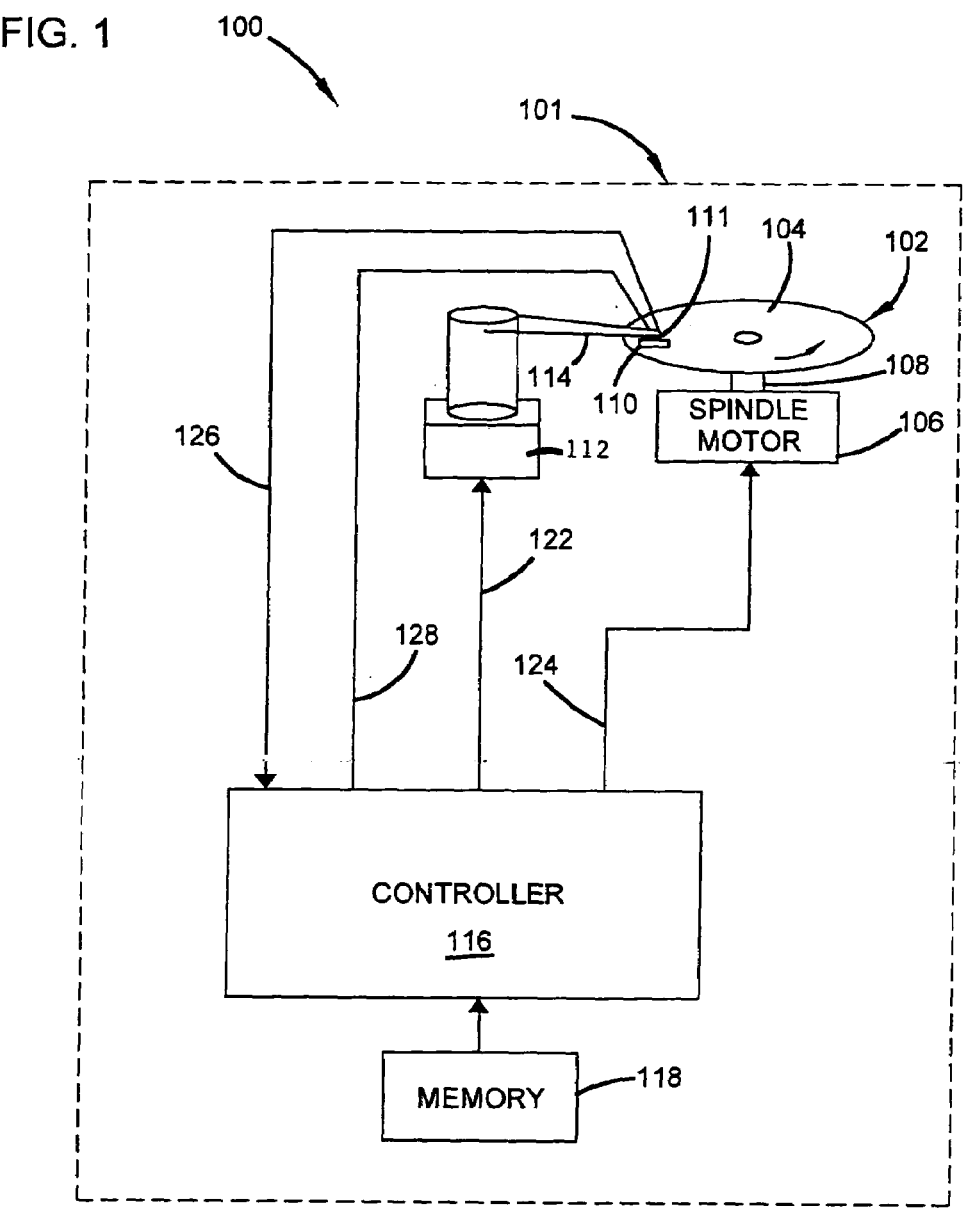
FIG. 1 is a simplified block diagram of a disc storage system in accordance with an embodiment of the present invention.

FIG. 1 is a very simplified block diagram of a disc storage system 100 in accordance with an embodiment of the present invention. Disc storage system 100 includes a housing 101 and a disc storage medium 102 having a data surface 104. Disc 102 is coupled to a spindle motor 106 through a spindle 108. A transducing head, supported by slider 110, is positioned relative to surface 104 for reading and writing information onto surface 104. Slider 110 is coupled to an actuator 112 through an armature 114. The transducer on slider 110 can read or write information on a desired location on surface 104 by moving slider 110 with actuator 112 in a manner to position the transducer radially while disc 102 rotates.

System 100 further includes a controller 116 that controls the radial position of slider 110 by energizing actuator 112 over control connection 122. Further, controller 116 controls operation of motor 106 over control connection 124. Thus, controller 116 can position slider 110 to substantially any desired location on disc surface 104. Once positioned, information can be read from, or written to, disc surface 104 by sending or receiving data through read/write channel 126 which couples control circuitry to slider 110.

Figure 2:
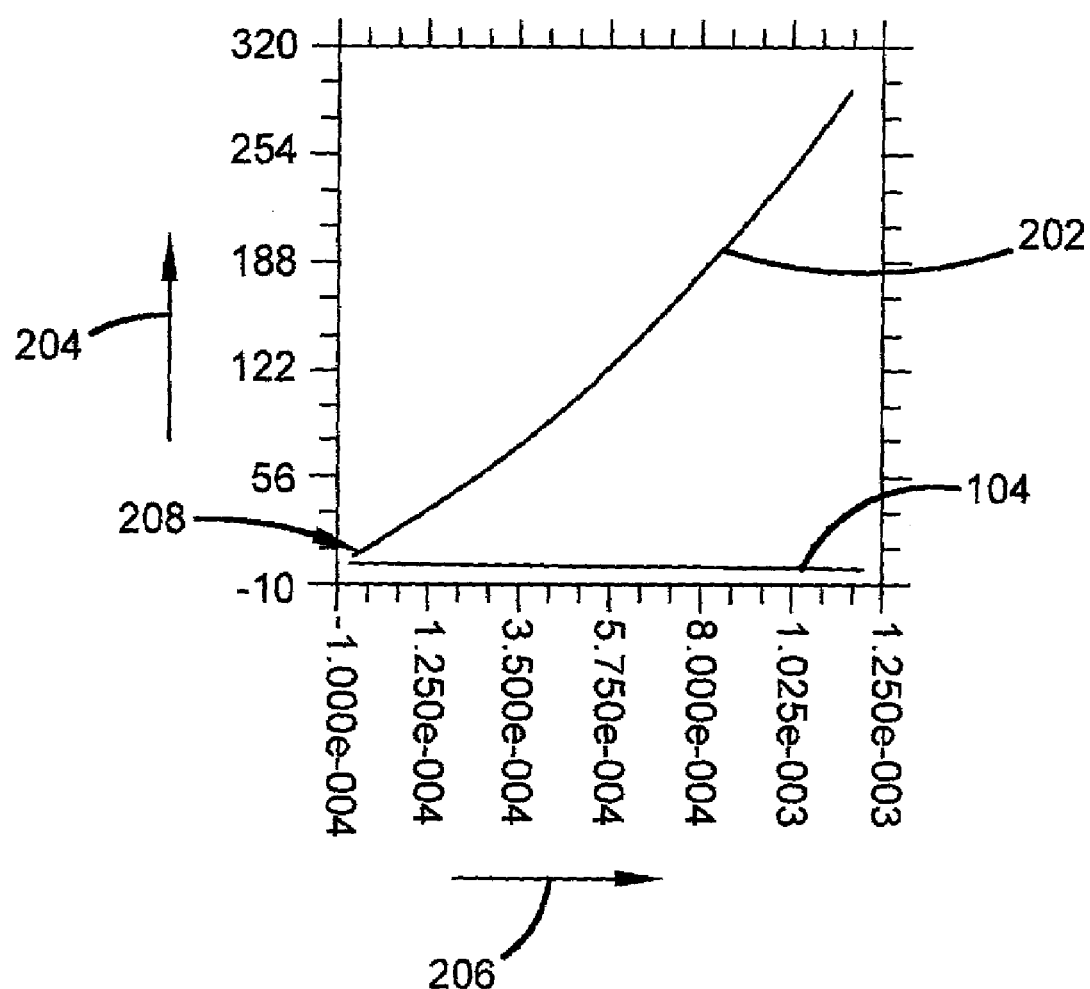
FIG. 2 is a simplified diagram of a cross section of an air-bearing surface of a slider flying over a disc surface.
Figure 3:
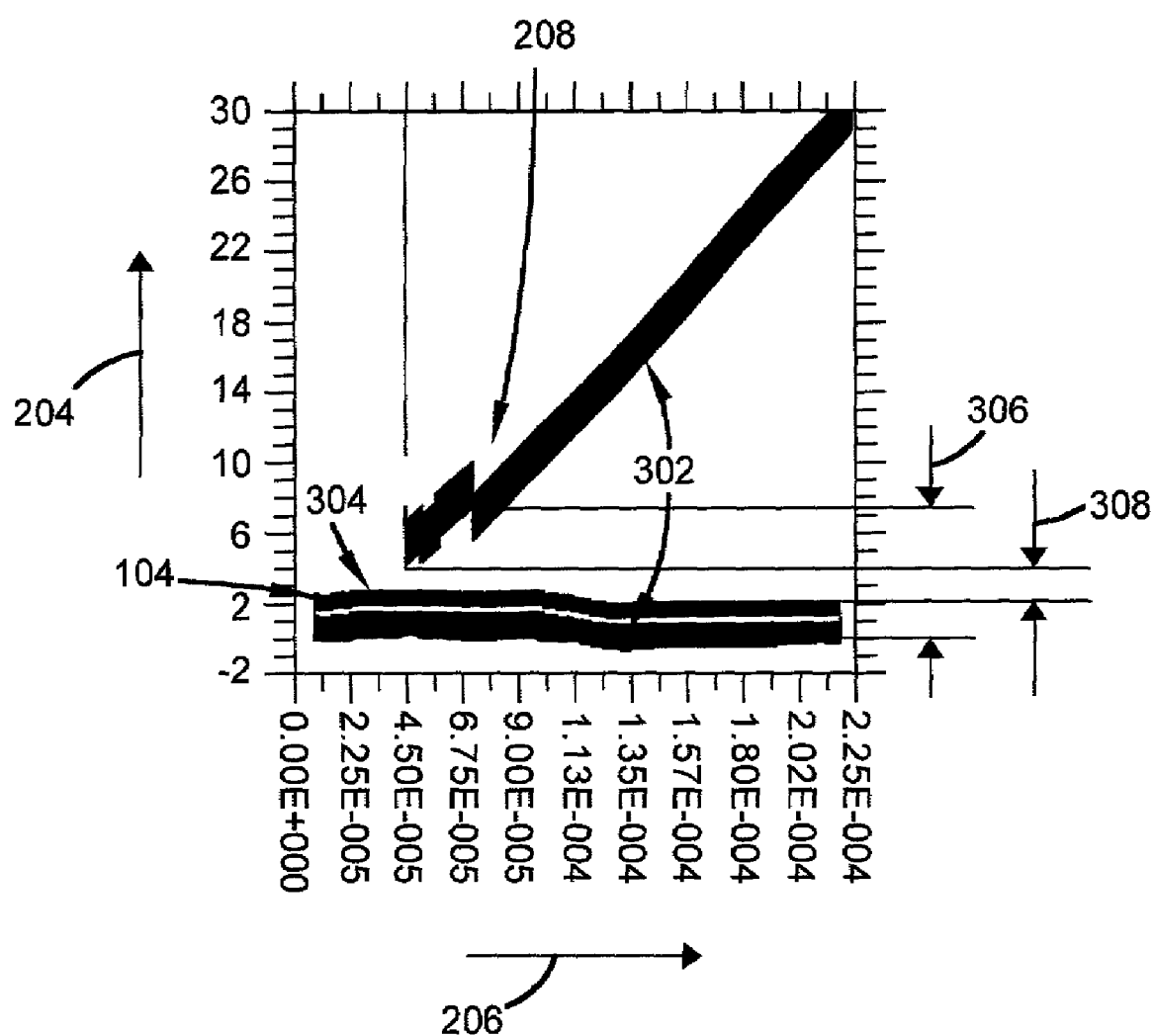
FIG. 3 is an enlarged view of a trailing end of the air bearing surface shown in FIG. 2.

During the operation of disc storage system 100, the slider 110 flies above the spinning recording media surface 104. The fly height of slider 110 needs to be kept low enough as required for reading and writing the desired high areal bit density. The fly height required may be as low as about 2–5 nanometers. An air-bearing surface that is patterned on a face of slider 110 that opposes disc surface 104 influences the slider fly height. However, the air bearing itself is usually not stable enough to maintain very small separation distances between slider 110 and disc surface 104 in very high density disc drives, such as system 100, as the topography of disc surface 104 varies. FIG. 2 is a simplified diagram of a cross section of an airbearing surface 202 of slider 110 flying over disc surface 104. The height of slider 110 in nanometers is plotted along vertical axis 204 and the length of slider 110 in meters is plotted along horizontal axis 206. FIG. 3 illustrates an enlarged view of a trailing end 208 (FIG. 2) of air-bearing surface 202 of slider 110. At extremely low fly heights, the diamond-like carbon coating 302, pole tip recession, and lube layer 304 take up a significant portion of magnetic spacing 306, thereby leaving a very small mechanical spacing 308 between slider 110 and disc surface 104. For a magnetic spacing of about 7 nanometers, the corresponding mechanical spacing may be only 2 nanometers. As mentioned above, the airbearing itself cannot maintain proper clearance with disc surface 104 for such a small mechanical spacing or fly height.

System 100 employs a memory 118 that stores a topography map of disc surface 104 which is utilized by controller 116 to control the fly height of slider 110. The topography map database includes topography data values corresponding to different radial and circumferential positions on the disc surface. The topographic mapping process is described further below.

When slider 110 moves over disc surface 104, controller 116 receives information regarding the current position of slider 110 via read/write channel 126 or over a separate control connection (not shown) dedicated to providing slider position information. Based on the current position of the slider, controller 116 selects topography data values from memory 118 and sends fly height control signals over control connection 124 which is coupled to a microactuator 111. The microactuator 111 actuates the fly height spacing as a function of the fly height control signals it receives over control connection 128. Thus, the fly height of slider 110 is controlled with the help of an open loop system with only a feed forward path that includes controller 116, control connection 128 and microactuator 111. In contrast, a prior art technique for fly height control employs a complex closed loop systems that sense fly height in real time using a fly height sensor and accompanying sensor circuitry, compares the sensed fly height against a reference fly height, and adjusts the gap between the slider and the disc surface in accordance with the departure of the sensed fly height of the slider from the reference fly height.

Memory 118 is preferably a high access speed low cost memory that is non-volatile (does no lose it contents upon loss of power to the disc drive). A non-volatile random access memory, such as magnetoresistive random access memory is suitable for use as memory 118. Memory 118 may also include shift registers that are capable of providing controller 116 topography data values of serially ordered adjacent positions on the disc surface with each data value supplied after a constant interval of time. The constant time interval may be set to different values.

Figures 1, 4:
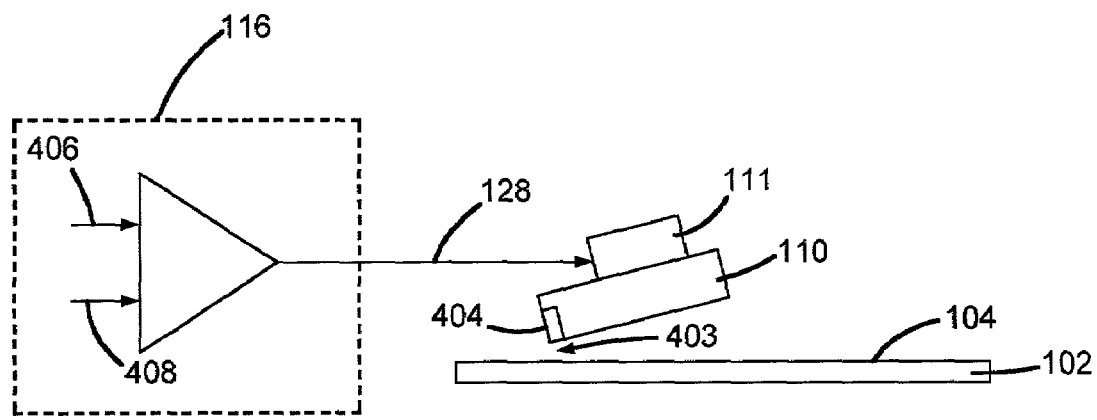
Figures 2, 4:
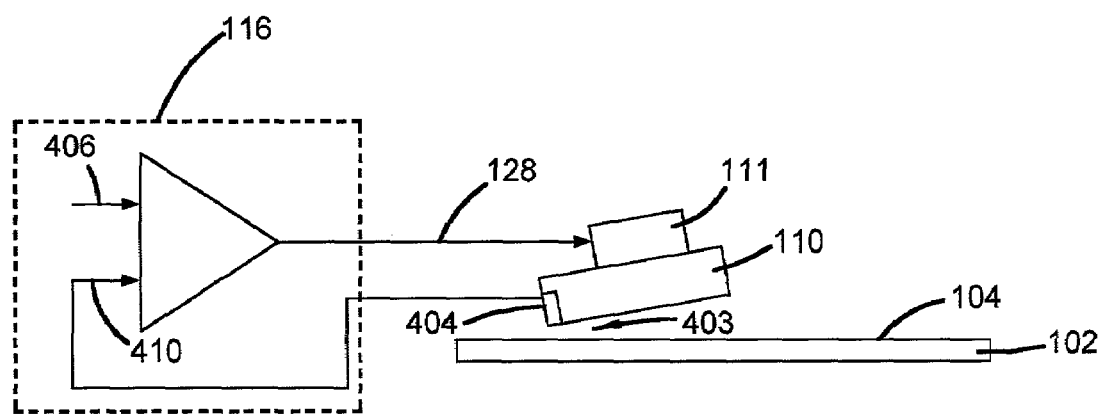

FIGS. 4-1 and 4-2 are simplified block diagrams of a portion of the disc drive illustrating fly height adjustment in accordance with embodiments of the present invention. For simplification armature 114 (FIG. 1) is not shown in FIGS. 4-1 and 4-2 and microactuator 111 is shown positioned directly on slider 110. However, the position of microactuator 111 depends upon the type of microactuator employed. For example, if a capacitive microactuator is employed to adjust the fly height spacing 403 between transducer head 404 and disc surface 104, then a first capacitive electrode would be disposed on slider 110 as shown in FIG. 4-1 and disc 102 would constitute the second capacitive electrode. Fly height control signals sent by controller 116 over control connection 128 are supplied as electrical signals to the capacitive microactuator which result in adjustment of fly height spacing 403 based on the variation in electrostatic attraction between the capacitive electrodes in response to the electrical signals. Other microactuators, such as piezoelectric beams may be employed to adjust fly height spacing 403 and may be positioned on armature 114 instead of being positioned directly on slider 110.

In general, the fly height control signal provided by controller 116 is determined based on a topography data value and a reference fly height value. In the embodiment shown in FIG. 4-1, the reference fly height value is a nominal fly height value 408. The nominal fly height value 408 is a predetermined value based on the areal density required for the disc drive. Controller 116 outputs a fly height control signal that is a function of topography data value 406 and nominal fly height value 408. In FIG. 4-2, an average value of the read signal amplitude 410, obtained from transducer head 404, is employed as the reference fly height. Here, the fly height control signal obtained is a function of topography data value 406 and the average read signal amplitude 410.

The overall topography of a disc surface (such as 104) may be obtained by utilizing a capacitance probe to measure transducer head to disc surface spacing at different radial and circumferential positions on the disc surface and processing the different measurements obtained as described in connection with FIG. 5 further below.

U.S. Pat. No. 6,046,596, entitled CAPACITANCE PROBE FOR MAGNETIC RECORDING HEAD TRANSDUCER TO DISC SURFACE SPACING MEASUREMENT describes one type of capacitance probe to measure transducer head to disc surface spacing. The capacitance probe includes a slider body that has first and second rails forming portions of an air bearing surface of the slider body. First and second cavities are formed in the first and second rails of the slider body at the air bearing surface. First and second capacitance plates are positioned within the first and second cavities, respectively, such that a surface of each of the first and second capacitance plates is substantially coplanar with at least portions of the air bearing surface. By forming the capacitance plates in cavities at the air bearing surface such that surfaces of the capacitance plates form portions of the air bearing surface, the flying characteristics of the slider body are preserved and dynamic fly height measurements can be made between either of the capacitance plates and the disc surface.

Figure 5:
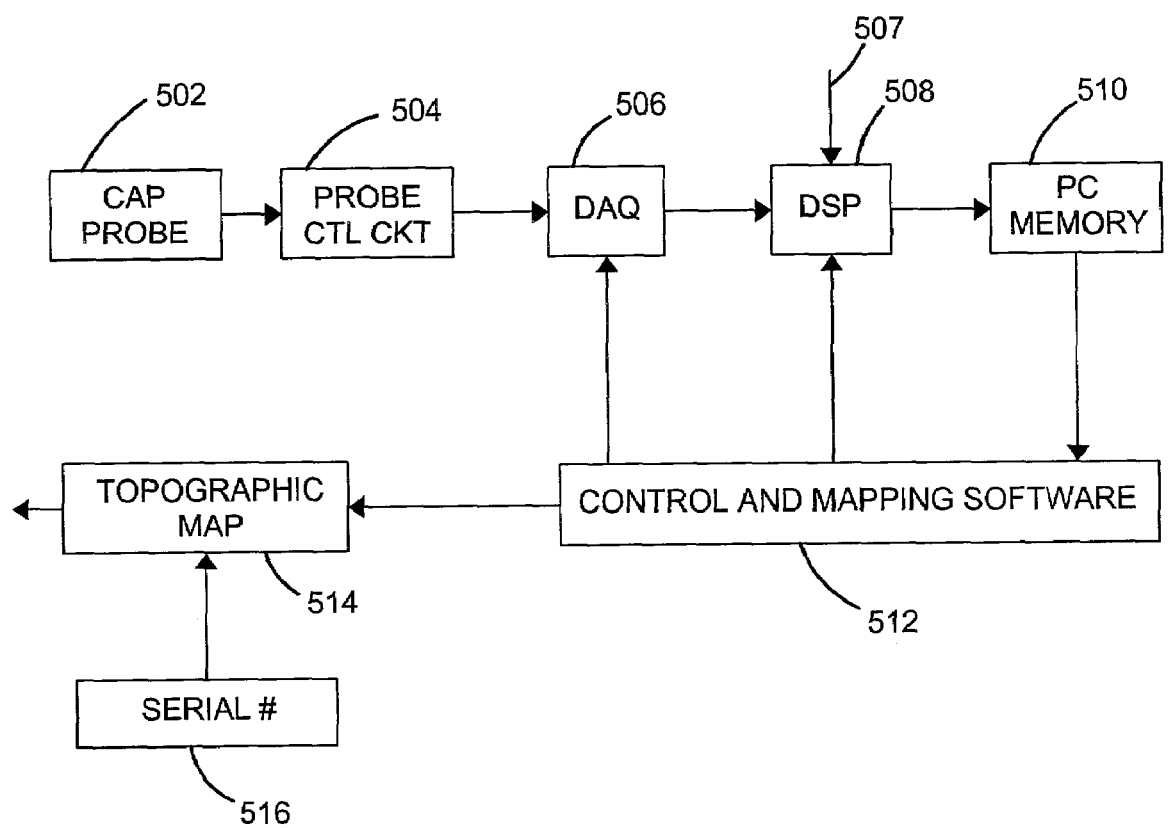
FIG. 5 shows a simplified functional block diagram of a test system for topographic mapping of disc surfaces.

FIG. 5 shows a simplified functional block diagram of a test system for topographic mapping of disc surfaces. System 500 employs the capacitance probe described above to obtain fly height measurements, and processes the fly height measurement data to obtain a topographic map of the disc surface. In FIG. 5, capacitance probe 502 is controlled by capacitance probe control circuitry 504, which passes signals from the capacitance probe 502 to a high-speed data acquisition board (DAQ) 506 that is included in a personal computer (PC). Operation of the DAQ 506 is under control of control and mapping software 512 which is executing in a PC. The data collected by the DAQ 506 is provided to a digital signal processor (DSP) 508, which also receives information reflecting the radial and circumferential position (indicated by arrow 507) of capacitance probe head 502 relative to the disc being analyzed. The DSP 508 is also operating under control of the control and mapping software 512. The accumulated data, correlated with the radial and circumferential position on the disc, is stored in the PC memory 510. Once collection of data for the entire disc surface is completed, the control and mapping software outputs a topographic map 514 of the disc surface. Input 516 is employed to enter a disc serial number that correlates the topographic map with the disc being analyzed. A data base containing topographic data for individual discs is loaded into a finished disc drive which incorporates the discs. This topographic data is used to control the fly height of the sliders as described above in connection with FIGS. 1 through 4. The disc topography need not have to be mapped for every track or at very high frequency within a track. The level of topography mapping needed depends upon the areal density required for a particular type of disc drive. The writing of servo location patterns on the disc surface and the topographic mapping processes are preferably carried out during the same stage of the disc drive manufacturing process.

While the block diagram 500 and accompanying discussion above envision that the test system to measure topography will be implemented in a computer system, such as a high-performance personal computer, a person skilled in the art will realize that the logic associated with the test system could also be implemented in other commercially available systems.

In summary, a disc drive data storage system 100 is provided, which includes a disc storage medium 102 having a disc surface 104. The system 100 also includes an armature 114 and a slider 110 coupled to the armature 114. The slider 110 supports a transducer head 404 that communicates with the disc storage medium 102. The slider 110 flies above the disc surface 104 and positions the transducer head 404 proximate the disc surface 104. Data representing a topography map of the disc surface is stored in a memory 118. A controller 116 controls the fly height 403 of the slider 110 above the disc surface 104 as a function of the topography map of the disc surface 104.

A method of controlling fly height of a slider 110 in a disc drive 100 includes providing a fly height spacing between the slider 110 and a disc surface 104. The method also includes actuating the fly height spacing as a function of a received fly height control signal and providing the fly height control signal as a function of a topography map of the disc surface 104.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive storage system while maintaining substantially the same functionality without departing from the scope and spirit of the present invention. In addition, although the preferred embodiment described herein is directed to utilizing disc surface topography for slider fly control for a disc drive storage system, it will be appreciated by those skilled in the art that the teachings of the present invention can be applied to any other systems that, in general, include sliders that fly over a surface, without departing from the scope and spirit of the present invention. Although the test system employed to obtain a topographic map of the disc surface utilizes a capacitance probe for fly height measurement, any type of fly height measurement probe may be employed.

What is claimed is:

1. A disc drive data storage system, comprising:
   a disc storage medium having a disc surface;
   an armature;
   a slider, coupled to the armature, supporting a transducer head for communicating with the disc storage medium, the slider is adapted to fly above the disc surface and to position the transducer head proximate the disc surface;
   a memory adapted to store data representing a topography map of the disc surface; and
   a controller, responsive to the memory, adapted to control a fly height of the slider above the disc surface as a function of the topography map of the disc surface, the fly height control is carried out independent of a sensed fly height feedback.

2. The apparatus of claim 1 further comprising a microactuator, coupled to the slider, that actuates the fly height of the slider in response to a fly height control signal provided by the controller.

3. The apparatus of claim 2 wherein the fly height control signal is a function of a nominal fly height value and a topography map value for a location on the disc surface.

4. The apparatus of claim 2 wherein the microactuator is a capacitive microactuator.

5. The apparatus of claim 4 wherein the capacitive microactuator comprises a first capacitive electrode surface that is disposed on the slider and that faces a second portion of the disc surface that forms a second capacitive electrode.

6. The apparatus of claim 1 wherein the memory is non-volatile random access memory.

7. The apparatus of claim 1 wherein the memory is non-volatile magnetoresistive random access memory.

8. The apparatus of claim 1 wherein the memory includes shift registers.

9. The apparatus of claim 1 wherein the topography map of the disc surface is obtained by:
   measuring a separation distance between a capacitance probe and the disc surface at a plurality of locations on the disc surface to obtain a plurality of separation distance values, wherein each one of the plurality of separation distance values corresponds to a different one of the plurality of locations; and
   processing the plurality of separation distance values for the corresponding plurality of locations to obtain the topography map of the disc surface.

10. A method of controlling fly height of a slider in a disc drive, comprising steps of:
   (a) providing a fly height spacing between the slider and a disc surface;
   (b) actuating the fly height spacing as a function of a received fly height control signal; and (c) providing the fly height control signal as a function of a topography map of the disc surface and independent of a sensed fly height feedback.

11. The method of claim 10 wherein the actuating step (b) is performed capacitively.

12. The method of claim 11 wherein the capacitive actuation is performed by a first capacitive electrode surface that is disposed on the slider and that faces a second portion of the disc that forms a second capacitive electrode.

13. The method of claim 10 wherein the topography map of the disc surface is obtained by:
   measuring a separation distance between a capacitance probe and the disc surface at a plurality of locations on the disc surface to obtain a plurality of separation distance values, wherein each one of the plurality of separation distance values corresponds to a different one of the plurality of locations; and
   processing the plurality of separation distance values for the corresponding plurality of locations to obtain the topography map of the disc surface.

14. A disc storage system comprising:
   a slider supporting a transducer head for communicating with a disc storage medium, the slider adapted to fly above a disc surface of the disc storage medium and to position the transducer head proximate the disc surface; and
   a controller means, responsive to the memory, adapted to control a fly height of the slider above the disc surface as a function of a topography map of the disc surface and independent of a sensed fly height feedback.

15. The apparatus of claim 14 further comprising a microactuator, coupled to the slider, that actuates the fly height of the slider in response to a fly height control signal provided by the controller means.

16. The apparatus of claim 15 wherein the fly height control signal is a function of a nominal fly height value and a topography map value for a location on the disc surface.

17. The apparatus of claim 15 wherein the microactuator is a capacitive microactuator.

18. The apparatus of claim 15 wherein the capacitive microactuator comprises a first capacitive electrode surface that is disposed on the slider and that faces a second portion of the disc surface that forms a second capacitive electrode.

19. A disc drive data storage system, comprising:
   a disc storage medium having a disc surface;
   an armature;
   a slider, coupled to the armature, supporting a transducer head for communicating with the disc storage medium, the slider is adapted to fly above the disc surface and to position the transducer head proximate the disc surface;
   a memory adapted to store data representing a topography map of the disc surface;
   a controller, responsive to the memory, adapted to control a fly height of the slider above the disc surface as a function of the topography map of the disc surface; and
   a microactuator, coupled to the slider, that actuates the fly height of the slider in response to a fly height control signal provided by the controller,
   wherein the fly height control signal is a function of an average fly height value determined from a read signal amplitude and a topography map value for a location on the disc surface.

* * * * *